(12) United States Patent  
Skarda et al.

(10) Patent No.: US 9,930,994 B1  
(45) Date of Patent: Apr. 3, 2018

(54) ELECTRICALLY-POWERED BUTTER HUT

(71) Applicants: Terrance Skarda, Lady Lake, FL (US); Marilyn Skarda, Lady Lake, FL (US)

(72) Inventors: Terrance Skarda, Lady Lake, FL (US); Marilyn Skarda, Lady Lake, FL (US)

( * ) Notice: Subject to any disclaimer, the term of this patent is extended or adjusted under 35 U.S.C. 154(b) by 143 days.

(21) Appl. No.: 15/000,379

(22) Filed: Jan. 19, 2016

(51) Int. Cl.  
*F25B 21/04* (2006.01)  
*A47J 41/00* (2006.01)

(52) U.S. Cl.  
CPC ............ *A47J 41/005* (2013.01); *F25B 21/04* (2013.01)

(58) Field of Classification Search  
CPC ................................. F25B 21/02; F25D 11/00  
USPC .......................................... 62/3.2, 3.7, 457.1  
See application file for complete search history.

(56) References Cited

U.S. PATENT DOCUMENTS

| | | | |
|---|---|---|---|
| 2,253,927 A | 8/1941 | Butler | |
| 3,130,288 A * | 4/1964 | Monaco | A47J 27/004 |
| | | | 126/369 |
| 3,241,706 A * | 3/1966 | Monaco | A47J 27/10 |
| | | | 108/44 |
| 4,005,586 A | 2/1977 | Lyons | |
| 5,611,206 A * | 3/1997 | Sargent | F25B 21/04 |
| | | | 220/23.4 |
| 6,244,065 B1 * | 6/2001 | Wuestman | F25D 3/08 |
| | | | 220/23.4 |
| D476,851 S | 7/2003 | Wuestman | |
| 8,960,441 B1 * | 2/2015 | Marquis | A47G 19/26 |
| | | | 206/525 |

FOREIGN PATENT DOCUMENTS

WO    WO2004010062 A1    1/2004

* cited by examiner

*Primary Examiner* — Melvin Jones  
(74) *Attorney, Agent, or Firm* — Kyle A. Fletcher, Esq.

(57) ABSTRACT

The electrically powered butter storage device is adapted for use in storing butter. The electrically powered butter storage device is designed to cool and warm butter while it is being stored within the electrically powered butter storage device. The electrically powered butter storage device is adapted to use one or more commonly available butter dishes that may or may not have a lid. Each of the one or more butter dishes are placed upon one or more electrically controlled heating and cooling elements which can be used to chill or warm the individual butter dishes as desired. The electrically powered butter storage device comprises a housing, one or more temperature elements, a control system, a fan, and a power connection.

14 Claims, 6 Drawing Sheets

ELECTRICALLY-POWERED BUTTER HUT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal or domestic articles, more specifically, a storage device for food that in integrally heated and cooled.

SUMMARY OF INVENTION

The electrically powered butter storage device is adapted for use in storing butter. The electrically powered butter storage device is designed to cool and warm butter while it is being stored within the electrically powered butter storage device. The electrically powered butter storage device is adapted to use one or more commonly available butter dishes that may or may not have a lid. Each of the one or more butter dishes are placed upon one or more electrically controlled heating and cooling elements which can be used to chill or warm the individual butter dishes as desired.

These together with additional objects, features and advantages of the electrically powered butter hut will be readily apparent to those of ordinary skill in the art upon reading the following detailed description of the presently preferred, but nonetheless illustrative, embodiments when taken in conjunction with the accompanying drawings.

In this respect, before explaining the current embodiments of the electrically powered butter hut in detail, it is to be understood that the electrically powered butter hut is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electrically powered butter hut.

It is therefore important that the claims be regarded as including such equivalent construction insofar as they do not depart from the spirit and scope of the electrically powered butter hut. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
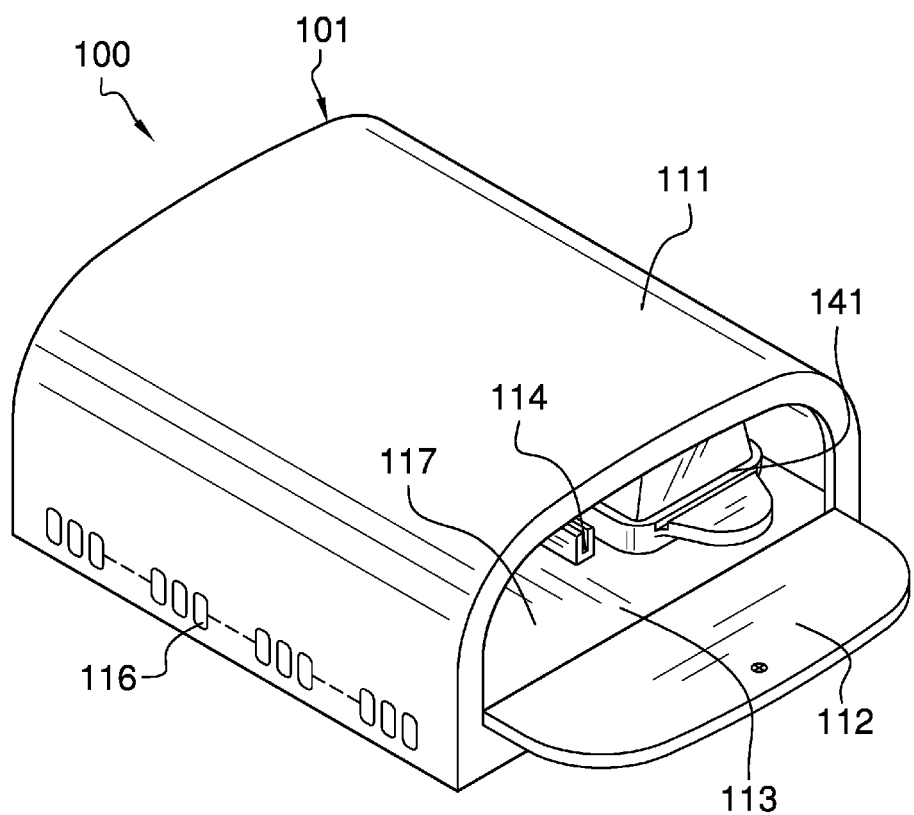
FIG. 1 is a perspective view of an embodiment of the disclosure.
Figure 2:
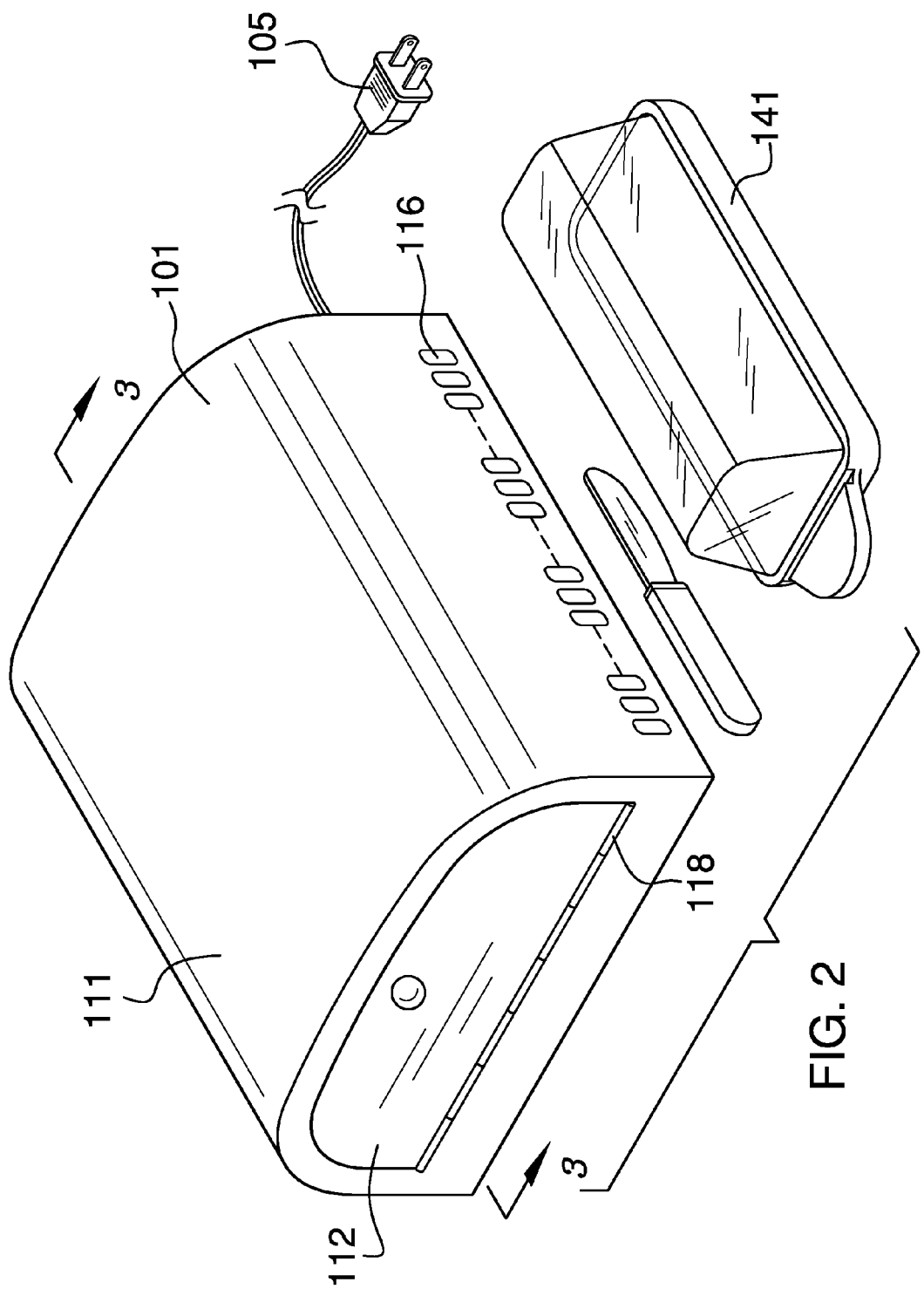
FIG. 2 is a perspective view of an embodiment of the disclosure.
Figure 3:
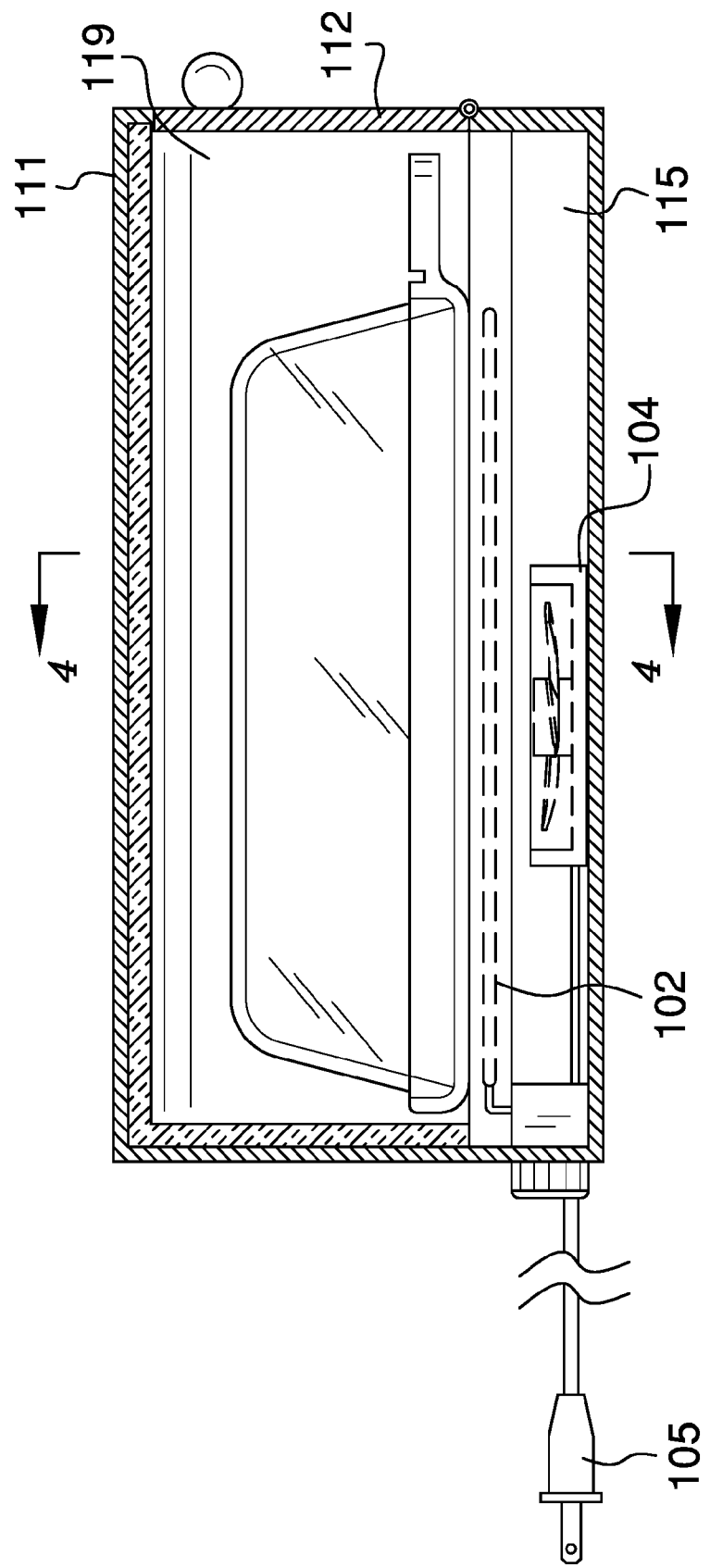
FIG. 3 is a cross-sectional view of an embodiment of the disclosure across 3-3 in FIG. 2.
Figure 4:
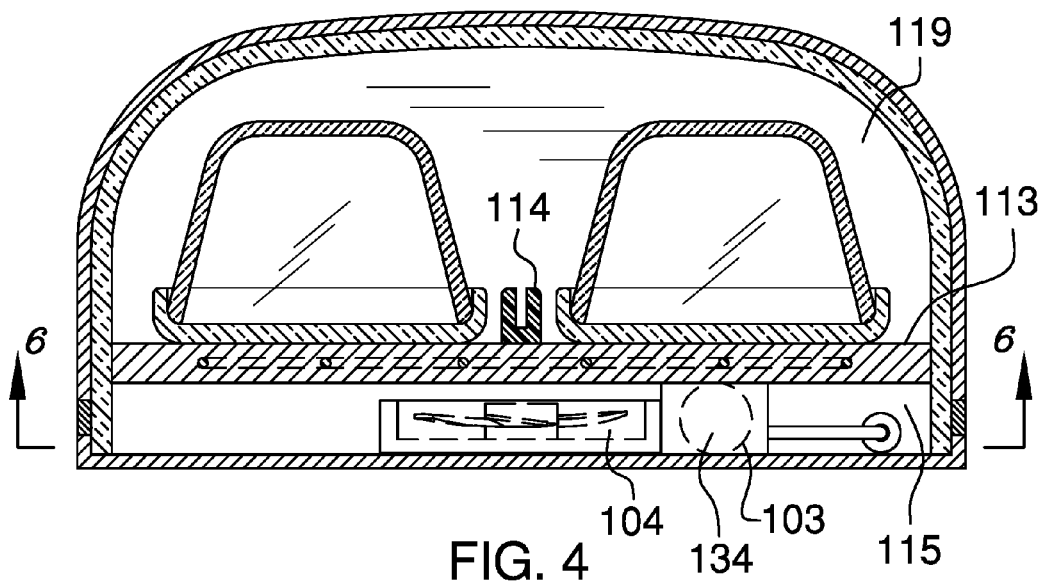
FIG. 4 is a cross-sectional view of an embodiment of the disclosure across 4-4 in FIG. 3.
Figure 5:
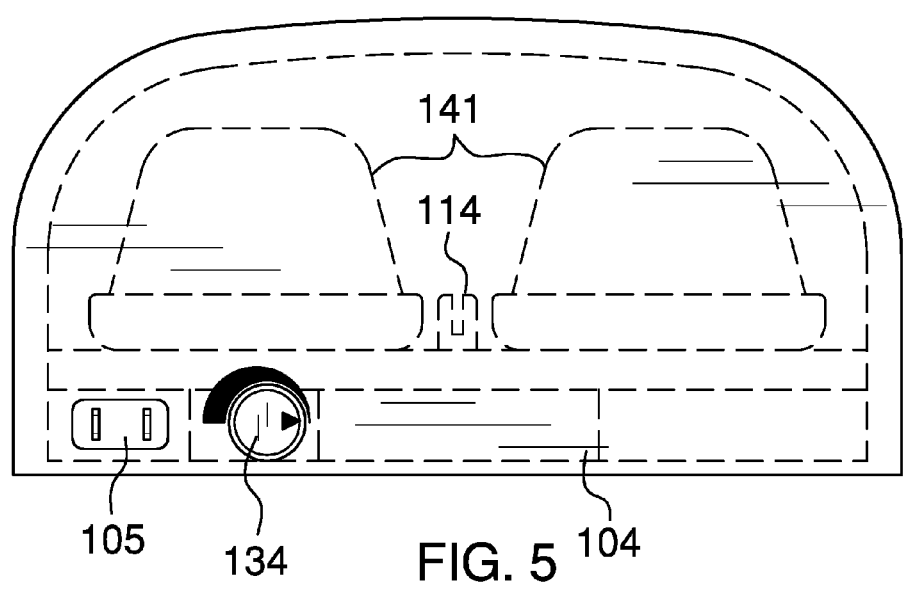
FIG. 5 is a rear view of an embodiment of the disclosure.
Figure 6:
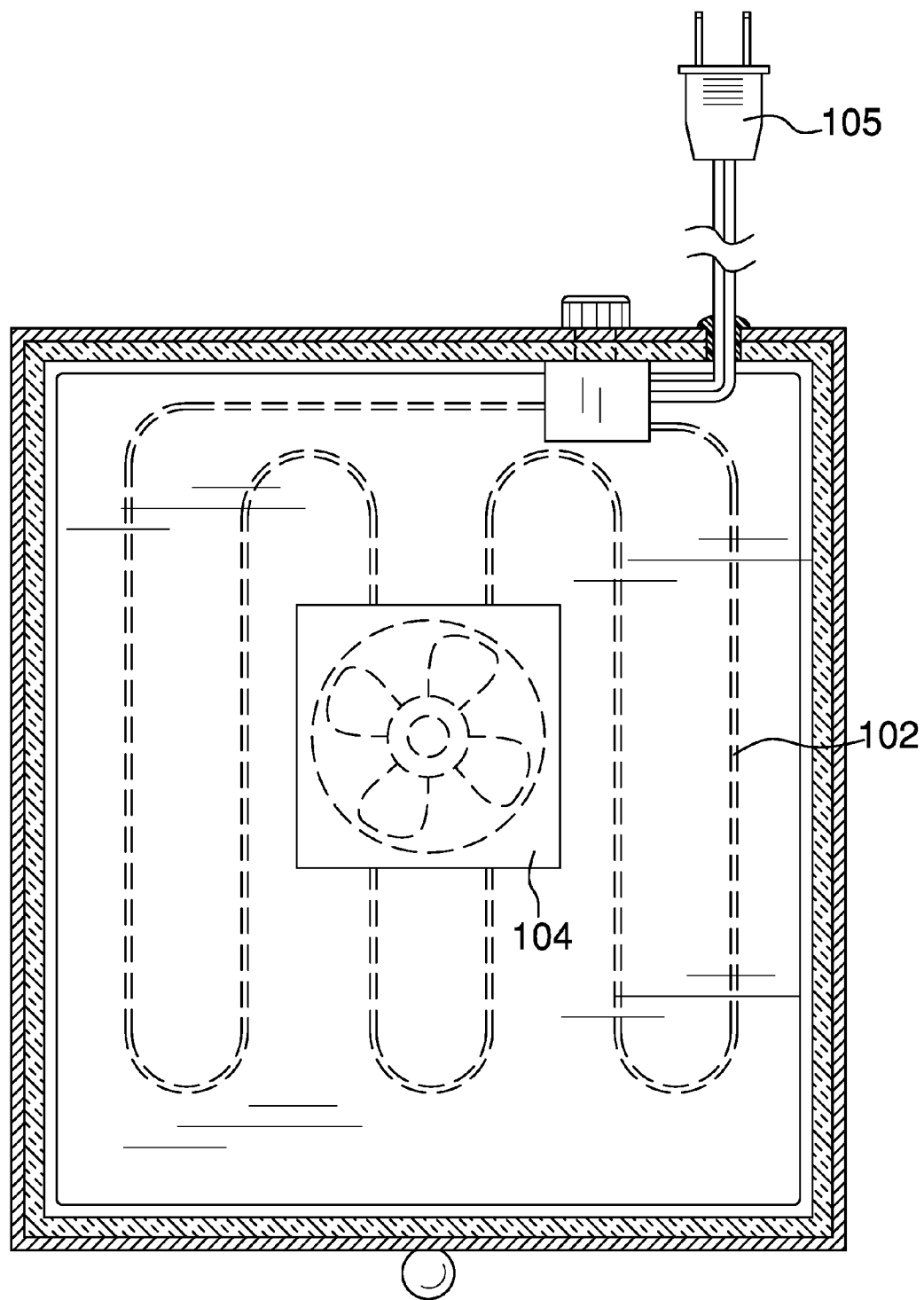
FIG. 6 is a cross-sectional view of an embodiment of the disclosure across 6-6 in FIG. 4.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 7.

The electrically powered butter hut 100 (hereinafter invention) comprises a housing 101, one or more temperature elements 102, a control system 103, a fan 104, and a power connection 105. The invention 100 is adapted for use in storing butter. The invention 100 is designed to cool and warm butter while the butter is being stored within the invention 100. The invention 100 is adapted to use one or more commonly available butter dishes 141 that may or may not have a lid. Each of the one or more butter dishes 141 is placed upon one or more temperature elements 102 which can be used to chill or warm the individual butter dishes 141 as desired.

The housing 101 comprises a shell 111, a door 112, a shelf 113, a knife holder 114, a cooling chamber 115, and a plurality of vents 116. The shell 111 is a rigid casing that is used to contain the invention 100 as well as the one or more butter dishes 141 that will be stored within the invention 100. The shell 111 has formed in it a port 117 that allows access to the interior of the shell 111. The door 112 is a rotating barrier that is attached to the shell 111 such that it covers the port 117. The door 112 is attached to the shell 111 using a hinge 118, which acts as the pivot around which the door 112 will rotate. The housing 101 is formed with a shelf 113 that divides the interior of the housing 101 into a storage chamber 119 and a cooling chamber 115.

The storage chamber 119 is located above the cooling chamber 115 and is the interior space within the housing 101 that is used to store the one or more butter dishes 141. The cooling chamber 115 is designed to receive the fan 104. The cooling chamber 115 is formed with a plurality of vents 116 that vents 116 are provided to allow air to flow through the cooling chamber 115. The shelf 113 is further formed to receive the one or more temperature elements 102. Each of the one or more temperature elements 102 is a surface upon which a butter dish 141 is placed. Each of the one or more temperature elements 102 is a device that is designed to maintain a designated temperature for the purpose of heating or cooling butter stored in the butter dish 141 to the preferred serving temperature. The shelf 113 is further formed with a knife holder 114, which is an apparatus that is designed to hold a knife intended to cut the butter stored in the butter dish 141.

Figure 7:
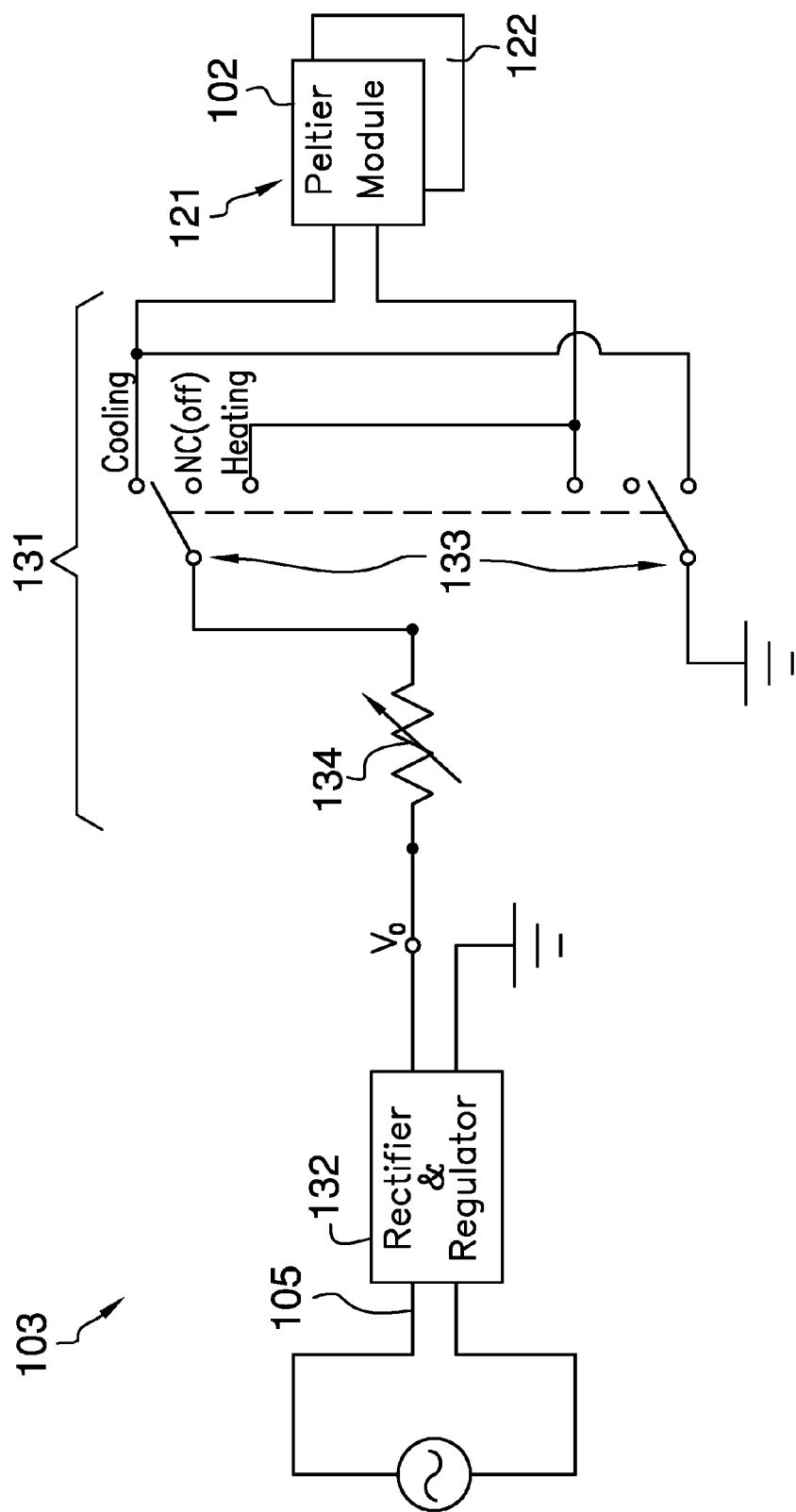
FIG. 7 is an electrical schematic of an embodiment of the disclosure.

The control system 103 further comprises one or more control circuits 131, and a voltage rectifier regulator 132. The voltage rectifier regulator 132 takes electricity from the national electric grid, a provided through the power connection 105 and converts it into a regulated DC voltage that is required for the operation of each of the one or more temperature elements 102. Every individual temperature element 136 selected from the one or more temperature elements 102 has associated with it an individual control circuit 135 selected from the one or more control circuits 131. The purpose of each individual control circuit 135 is: 1) to control whether the individual temperature element 136 that is associated with the individual 2) to control the temperature of the individual temperature element 136 associated with the individual control circuit 135. Each of the one or more control circuits 131 further comprises a DPTT switch 133 and a temperature adjustment dial 134. As shown in FIG. 7, the DPTT switch 133 is a double pole three throw switch. The DPTT switch 133 is wired to: 1) turn the individual temperature element 136 associated with the individual control circuit 135 on and off; and, 2) to switch the operation of the individual temperature element 136 associated with the individual control circuit 135 between a cooling function and a heating function. The temperature adjustment dial 134 is a variable resistor, such as a potentiometer, that regulates flow through the individual temperature element 136 to control the temperature of the individual temperature element 136.

In the first potential embodiment of the disclosure, the one or more temperature elements 102 further comprise a first Peltier module 121, and a second Peltier module 122. The Peltier module can serve both as the heating element or the cooling element depending on the direction of the current flow through the device. The Peltier module has two surfaces on opposite sides of the device. When current flows through the Peltier module, heat is transferred from one surface to the creates a cold side and a warm side of the Peltier module that can be used as the cooling or heating elements of the invention 100. If the current flow through the Peltier device is reversed, the direction of heat transfer are reversed then the cold and warm sides of the Peltier module are also reversed.

The fan 104 is a commercially available fan that is used to force air flow through the cooling chamber 115 of the housing 101. The purpose of the fan 104 is to prevent the warm side of either the first Peltier module 121 or the second Peltier module 122 from overheating the housing 101 when either the first Peltier module 121 or the second Peltier module 122 is in a cooling mode.

In the first potential embodiment of the disclosure, the power connection 105 is a NEMA 5-15 to an IEC 320 C13 cable that is used to connect the invention 100 to the national power grid.

To use the invention 100, butter is placed in a butter dish 141 and is placed in the housing 101 on a temperature element selected from the one or more temperature elements 102. If desired, the selected temperature element can be turned to a warming mode or a cooling mode using the DPTT switch 133 associated with the selected temperature element. The desired temperature for the storage of the butter is set using the temperature adjustment dial 134 associated with the selected temperature element.

The housing 101 can be made from one or more components molded from plastic. Suitable plastics include, but are not limited to, polycarbonate or poly(methyl methacrylic). The fan 104, power connection 105, one or more temperature elements 102, and the components of the control system 103 are commercially available. Circuit designs and methods to implement rectifier circuits and voltage regulators are well known and documented in the art.

The following definitions were used in this disclosure:

Hinge: As used in this disclosure, a hinge is a device that permits the turning, rotating, or pivoting of a first object relative to a second object.

Peltier Module: As used in this disclosure, a Peltier module refers to a flat solid state device that uses the Peltier thermoelectric effect to create a warm side of the device and a cool side of the device. The side of the device that is warm and the side of the device that is cool may be reversed via reversing the current flow through the device.

Pivot: As used in this disclosure, a pivot is a rod or shaft around which an object rotates or swings.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A food storage device comprising:
   a housing, one or more temperature elements, a control system, a fan, and a power connection;
   wherein the food storage device is adapted for use in storing butter;
   wherein the food storage device is designed to cool and warm butter while the butter is being stored within the food storage device;
   wherein the food storage device is adapted to use one or more butter dishes;
   wherein each of the one or more butter dishes is placed upon an individual temperature element selected from the one or more temperature elements;
   wherein each individual temperature element selected from the one or more temperature elements can be selected to chill or warm an individual butter dish selected from the one or more butter dishes independently from a selection made to chill or warm an individual butter dish selected made for the remaining individual temperature elements;

wherein the housing comprises a shell, a door, a shelf, a knife holder, a cooling chamber, and a plurality of vents;

wherein the shell is a rigid casing that is used to contain the one or more butter dishes as well as the remaining components of the food storage device;

wherein a port is formed in the shell;

wherein the door is a rotating barrier that is attached to the shell such that it covers the port;

wherein the door is attached to the shell using a hinge that acts as a pivot around which the door will rotate;

wherein the shelf divides the interior of the housing into a storage chamber and a cooling chamber.

2. The food storage device according to claim 1 wherein the storage chamber is located above the cooling chamber.

3. The food storage device according to claim 1 wherein the cooling chamber is designed to receive the fan.

4. The food storage device according to claim 3 wherein the cooling chamber further comprises a plurality of vents that are formed through the wall of the shell.

5. The food storage device according to claim 4 wherein the shelf is further formed to receive the one or more temperature elements.

6. The food storage device according to claim 5 wherein each of the one or more temperature elements is a device that is designed to maintain a designated temperature.

7. The food storage device according to claim 6 wherein the shelf is further formed with a knife holder.

8. The food storage device according to claim 7 wherein a control system further comprises one or more control circuits and a voltage rectifier regulator.

9. The food storage device according to claim 8 wherein each individual temperature element selected from the one or more temperature elements has associated with it an individual control circuit selected from the one or more control circuits.

10. The food storage device according to claim 9 wherein each individual temperature element selected from the one or more temperature elements has associated with it a warming mode and a cooling mode.

11. The food storage device according to claim 10 wherein each of the one or more control circuits further comprises a DPTT switch and a temperature adjustment dial.

12. The food storage device according to claim 11 wherein the DPTT switch is a double pole three throw switch.

13. The food storage device according to claim 12 wherein the one or more temperature elements comprise a first Peltier module.

14. The food storage device according to claim 13 wherein the one or more temperature elements comprise a second Peltier module.

* * * * *